United States Patent
Sagawa et al.

(10) Patent No.: US 9,353,004 B2
(45) Date of Patent: May 31, 2016

(54) DISPERSANT FOR A HYDRAULIC COMPOSITION

(75) Inventors: Keiichiro Sagawa, Wakayama (JP); Masaaki Shimoda, Wakayama (JP); Koji Nagasawa, Wakayama (JP)

(73) Assignee: KAO CORPORATION, Tokyo (JP)

( * ) Notice: Subject to any disclaimer, the term of this patent is extended or adjusted under 35 U.S.C. 154(b) by 66 days.

(21) Appl. No.: 14/005,190

(22) PCT Filed: Mar. 14, 2012

(86) PCT No.: PCT/JP2012/056493
§ 371 (c)(1),
(2), (4) Date: Sep. 13, 2013

(87) PCT Pub. No.: WO2012/124716
PCT Pub. Date: Sep. 20, 2012

(65) Prior Publication Data
US 2014/0005305 A1    Jan. 2, 2014

(30) Foreign Application Priority Data

Mar. 15, 2011    (JP) .................................. 2011-056449

(51) Int. Cl.
| | |
|---|---|
| *C04B 24/12* | (2006.01) |
| *C04B 24/26* | (2006.01) |
| *C04B 40/00* | (2006.01) |
| C04B 103/40 | (2006.01) |

(52) U.S. Cl.
CPC ........... *C04B 24/121* (2013.01); *C04B 24/2647* (2013.01); *C04B 40/0039* (2013.01); *C04B 2103/408* (2013.01)

(58) Field of Classification Search
CPC ................................................... C04B 24/121
USPC .......................................................... 524/5
See application file for complete search history.

(56) References Cited

U.S. PATENT DOCUMENTS

| | | | |
|---|---|---|---|
| 5,605,571 | A | 2/1997 | Buerge et al. |
| 6,149,725 | A | 11/2000 | Bürge et al. |
| 6,777,517 | B1 * | 8/2004 | Albrecht et al. ............ 526/317.1 |
| 2002/0035952 | A1 | 3/2002 | Sommer et al. |
| 2004/0244655 | A1 | 12/2004 | Buerge et al. |
| 2011/0021667 | A1 | 1/2011 | Hamai et al. |
| 2011/0021668 | A1 | 1/2011 | Hamai et al. |

FOREIGN PATENT DOCUMENTS

| | | | |
|---|---|---|---|
| DE | 199 26 611 | A1 | 12/2000 |
| EP | 0 941 975 | A | 9/1999 |
| EP | 1975136 | A1 | 10/2008 |
| EP | 2 594 540 | A1 | 5/2013 |
| JP | 1-246164 | A | 10/1989 |
| JP | 11-349363 | A | 12/1999 |
| JP | 2000-511151 | A | 8/2000 |
| JP | 2002-80250 | A | 3/2002 |
| JP | 2002-145651 | A | 5/2002 |
| JP | 2002-226245 | A | 8/2002 |
| JP | 2007-31166 | A | 2/2007 |
| KR | 10-2008-0081670 | A | 9/2008 |
| KR | 1020080081670 | A * | 9/2008 |
| WO | WO 2009/118652 | A1 | 10/2009 |
| WO | WO 2009/119893 | A1 | 10/2009 |
| WO | WO 2009/119897 | A1 | 10/2009 |
| WO | WO 97/19032 | A1 | 1/2012 |
| WO | WO 2012/008517 | A1 | 1/2012 |

OTHER PUBLICATIONS

Extended European Search Report, issued Aug. 29, 2014, for European Application No. 12757577.7.
International Preliminary Report on Patentability and Translation of the Written Opinion of the International Searching Authority (Forms PCT/IB/373 and PCT/ISA/237) for International Application No. PCT/JP2012/056493, issued Sep. 17, 2013.
International Search Report for PCT/JP2012/056493 mailed on Jun. 5, 2012.
Japanese Office Action and English translation thereof, dated Jul. 21, 2015, for Japanese Application No. 2012-042678.
Decision on Grant (including an English translation thereof) issued in the corresponding Russian Patent Application No. 2013145947 on Mar. 4, 2016.

* cited by examiner

*Primary Examiner* — Ling Choi
*Assistant Examiner* — Lanee Reuther
(74) *Attorney, Agent, or Firm* — Birch, Stewart, Kolasch & Birch, LLP

(57) ABSTRACT

The present invention provides a dispersant for a hydraulic composition containing N-methyldiethanolamine and a specific (meth)acrylic acid copolymer as a polycarboxylic acid copolymer dispersing agent to increase the fluidity of a hydraulic composition.

7 Claims, No Drawings

DISPERSANT FOR A HYDRAULIC COMPOSITION

FIELD OF THE INVENTION

The present invention relates to a dispersant for a hydraulic composition.

BACKGROUND OF THE INVENTION

Dispersants for a hydraulic composition are chemical admixtures, and used for dispersing cement particles, thereby reducing a unit water quantity necessary for achieving a required slump and enhancing workability and the like of a hydraulic composition. There are conventionally known dispersants, including naphthalene-based dispersants such as a naphthalenesulfonic acid-formaldehyde condensate, polycarboxylic acid-based dispersants such as a copolymer of a carboxylic acid and a monomer having an alkylene glycol chain, and melamine-based dispersants such as melamine-sulfonic acid-formaldehyde condensate.

Dispersants are also used in combination with an alkanolamine for a hardening strength at an early stage of a concrete. For example, JP-A2007-31166 discloses a splay material having a low alkali content and exhibiting good early strength development, that is provided by adding an acidic liquid hardening-accelerator containing aluminum, sulfur, and an alkanolamine, powder aluminium sulfate, and one or more inorganic compounds selected from the group having sulfates, aluminates, and hydroxides to a cement concrete. This document also discloses that a known water-reducing agent (dispersant), such as a lignosulfate-based one, a naphthalene-sulfonic acid-based one, or a polycarboxylic acid-based one, can be used to improve fluidity of a cement concrete.

JP-A 2000-511151 discloses a hardening-accelerator of an alkali metal salt or an alkaline earth metal salt of an organic or inorganic acid, and a multifunctional admixture containing a fatty acid aminosulfonic acid surfactant for a purpose of provide a multifunctional hydraulic cement admixture having both hardening-accelerating and air entraining of a hydraulic composition. This document also discloses a composition admixture further containing a water-reducing agent containing an alkali or alkaline earth metal salt of lignosulfonic acid, polycarboxylic acid, a naphthalene-sulfonic acid condensate, a melamine-sulfonic acid condensate, a hydroxylated carboxylic acid, or a hydrocarbon, and a composition admixture further containing an early strength enhancer containing an alkanolamine. This document describes that a preferred admixture contains triethanolamine or triisopropanolamine as the alkanolamine and calcium lignosulfonate as the water-reducing agent.

U.S. Pat. No. B5,605,571 discloses a combination of a hardening-accelerator with a high-range water-reducer for a hydraulic powder, containing a nitrate or sulfite component, a thiocyanic acid component, an alkanolamine component and a carboxylic acid component.

JP-A2002-226245 discloses a concrete mixture and a concrete composition, containing a trialkanolamine and a polycarboxylic acid or a salt thereof. JP-A01-246164 discloses an admixture for a hydraulic cement, containing an amidosulfonate and a water-soluble aminoalcohol. JP-A2002-080250 discloses a setting and hardening-accelerator containing a water-soluble aluminium salt containing a fluoride and an aluminium salt containing a sulfate, but not an alkali, alkaline metal, or chloride. JP-A2002-145651 discloses a cement composition containing $C_2S$ or $C_3S$, and $C_3A$ and $C_4AF$. WO-A2012/008517, published on Jan. 19, 2012, discloses a method for producing a hydraulic powder.

SUMMARY OF THE INVENTION

The present invention relates to a dispersant for a hydraulic composition, containing N-methyldiethanolamine and a copolymer having a constituent unit represented by the formula (1) and a constituent unit represented by the formula (2):

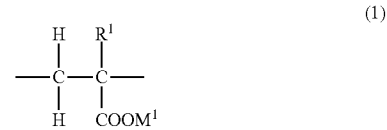

wherein, $R^1$ represents a hydrogen atom or a methyl group; and $M^1$ represents a hydrogen atom or a counter ion to form a salt;

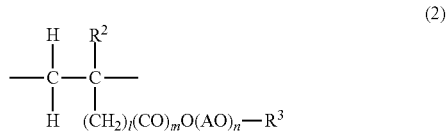

wherein, $R^2$ represents a hydrogen atom or a methyl group; AO represents an alkyleneoxy group having 2 to 4 carbon atoms; l is a number of 0 to 2; m is a number of 0 or 1; n is an average added mole number of AO and is a number of 2 to 300; and $R^3$ represents a hydrogen atom or an alkyl group having 1 to 4 carbon atoms.

The present invention also relates to a hydraulic composition, containing N-methyldiethanolamine, a copolymer having a constituent unit represented by the formula (1) and a constituent unit represented by the formula (2), a hydraulic powder, an aggregate, and water, wherein a weight ratio of water to the hydraulic powder, water/hydraulic powder, is 0.20 to 0.50.

The present invention further relates to use of a dispersant for a hydraulic composition containing N-methyldiethanolamine and a copolymer having a constituent unit represented by the formula (1) and a constituent unit represented by the formula (2) for enhancing fluidity of a hydraulic composition.

DETAILED DESCRIPTION OF THE INVENTION

In documents in Background of the invention, the use of an amine compound including diethanolamine, triethanolamine, and triisopropanolamine in a hydraulic composition containing a (meth)acrylic acid-containing copolymer as a polycarboxylic acid-containing copolymer for increasing an early strength of the composition has been found to generally reduce fluidity of the composition than that of a hydraulic composition containing only the polycarboxylic acid-containing copolymer, as shown in JP-A2007-31166, Examples and JP-A 2000-511151, Preparation Examples. To achieve the equivalent fluidity even with such an amine compound to that of a hydraulic composition containing only the polycarboxylic acid-containing copolymer, for example, an increased amount of the polycarboxylic acid-containing copolymer may be used. However, an increased amount of the copolymer tends to accelerate delaying of hardening of a hydraulic composition. To increase an early strength, an amount of the copolymer is preferably decreased, rather than increased.

The present invention provides a dispersant for a hydraulic composition prepared with a (meth)acrylic acid-containing copolymer as a polycarboxylic acid-containing copolymer, that increases fluidity of a hydraulic composition, while increasing 24-hour and 7-day hardening strengths of the hydraulic composition. As used herein, the "(meth)acrylic acid" refers to an acrylic and/or methacrylic acid.

The present inventors have found that a combination of a (meth)acrylic acid-containing copolymer as a polycarboxylic acid-containing copolymer with N-methyldiethanolamine in a hydraulic composition can increase fluidity right after preparation, or an initial fluidity of the composition, than that of a hydraulic composition containing only the (meth)acrylic acid-containing copolymer as the polycarboxylic acid-containing copolymer, while increasing 24-hour and 7-day hardening strengths of the composition. In other word, the combination according to the present invention can reduce an amount of the polycarboxylic acid-containing copolymer to achieve the equivalent fluidity to that of a hydraulic composition containing only the (meth)acrylic acid-containing copolymer as the polycarboxylic acid-containing copolymer.

A mechanism underlying the effects of the present invention is unknown, but assumed as follows. In preparation of a hydraulic composition, a hydraulic powder, water, and a copolymer (dispersant) are kneaded. In this time, adsorption of the copolymer on the surface of the hydraulic powder and crystal growth through a reaction of the hydraulic powder with water progress simultaneously. The copolymer adsorbed on the surface of the hydraulic powder gets buried into crystals growing by time and therefore has difficulty in dispersing function. A copolymer having a constituent unit derived from (meth)acrylic acid can form a salt at a carboxyl group with N-methyldiethanolamine. Formation of the salt prevents the absorption of the copolymer on the hydraulic powder and consequently reduces an amount of the copolymer buried in growing crystals of the hydraulic powder, resulting in an increased fluidity after the kneading. The effects of the present invention therefore should not be achieved with a copolymer having a phosphate group that has a large adsorption rate on a hydraulic powder or a copolymer having a constituent unit derived from a dicarboxylic acid that has a free carboxyl group when forming a salt with N-methyldiethanolamine. The effects of the present invention also should be reduced with an amine other than N-methyldiethanolamine due to an inadequate adsorption rate of the copolymer on the hydraulic powder.

According to the present invention, both an early strength and fluidity of a hydraulic composition can be increased. More specifically, provided is a dispersant for a hydraulic composition prepared with a (meth)acrylic acid-containing copolymer as a polycarboxylic acid-containing copolymer, that increases fluidity of a hydraulic composition, while increasing 24-hour and 7-day hardening strengths of the hydraulic composition.

<N-methyldiethanolamine>

The amine according to the present invention is N-methyldiethanolamine. The combination of the N-methyldiethanolamine with the (meth)acrylic acid-containing copolymer as the polycarboxylic acid-containing copolymer in a hydraulic composition can increase fluidity (also referred to as initial fluidity) of the hydraulic composition, while increasing 24-hour and 7-day hardening strengths of the hydraulic composition.

The N-methyldiethanolamine according to the present invention may be a commercial product. For increasing water-solubility, the N-methyldiethanolamine can be used in a salt form. Examples of the salt include sulfates, acetates, lactates, chlorides, formates, carbonates, silicates, and mixtures thereof. The N-methyldiethanolamine in the form having an increased water-solubility is easy to handle, for example, when preparing a concrete. In cases of using the N-methyldiethanolamine according to the present invention in a salt form, a weight of a contained amount or the like described below is not a weight of the salt itself, but a calculated value from the weight based on the amine form.

<(Meth)Acrylic Acid-Containing Copolymer as Polycarboxylic Acid-Containing Copolymer>

The copolymer according to the present invention has a constituent unit represented by the formula (1) [hereinafter, referred to as constituent unit 1] and a constituent unit represented by the formula (2) [hereinafter, referred to as constituent unit 2]. For example, the copolymer can be produced from constituent monomers containing acrylic acid or methacrylic acid providing the constituent unit 1, and a polyalkylene glycol acrylate or methacrylate or an ether having an alkyleneoxy group and an alkenyl group providing the constituent unit 2 (hereinafter, referred to as a monomer (2) providing the constituent unit 2). Acrylic acid or methacrylic acid may be in an acid form.

In the formula (1), $R^1$ represents a hydrogen atom or a methyl group. If $R^1$ represents a hydrogen atom, the constituent unit 1 is derived from acrylic acid, and if a methyl group, from methacrylic acid. In the formula (1), $M^1$ represents a hydrogen atom or a counter ion to form a salt. Examples of the counter ion include alkaline metal ions such as sodium and potassium ions, alkaline earth metal ions, and ammonium ions.

The monomer (2) is a compound that can provide a structure of the formula (2) in the copolymer, including, for example, a polyalkylene glycol monoester of (meth)acrylate and an ether from an alkenyl alcohol and an alkylene oxide. In the formula (2), AO represents an alkyleneoxy group having 2 to 4 carbon atoms. From the viewpoint of water-solubility of the copolymer, AO preferably represents an alkyleneoxy group having 2 or 3 carbon atoms, and more preferably an alkyleneoxy group (ethyleneoxy group) having 2 carbon atoms. n is an average added mole number of AO of 2 to 300. From the viewpoints of effects to increasing fluidity of a hydraulic composition and AO adduct productivity, n preferably ranges from 2 to 250, more preferably 2 to 200, and even more preferably 2 to 150. l is a number of 0 to 2. m is a number of 0 or 1. If m represents 0, —(CO)$_m$O— represents an ether bond. In this case, for increasing fluidity of a hydraulic composition, l is preferably a number of 1 or 2. If m is 1, —(CO)$_m$O— represents an ester bond. In this case, from the viewpoint of reactivity of a monomer, l is preferably 0. For increasing fluidity and a 24-hour hardening strength of a hydraulic composition, m is preferably 1. $R^3$ represents a hydrogen atom or an alkyl group having 1 to 4 carbon atoms. If m is 0, from the viewpoint of monomer productivity, $R^3$ preferably represents a hydrogen atom. If m is 1, $R^3$ preferably represents an alkyl group having 1 to 4 carbon atoms, because a monomer having $R^3$ representing a hydrogen atom may occur transesterification, and more preferably a methyl group from the viewpoint of water-solubility.

Specific examples of a polyalkylene glycol ester of (meth) acrylic acid as the monomer (2) include monoterminal-capped alkylene glycol esters of (meth)acrylic acid such as methoxypolyethylene glycol acrylate, methoxypolyethylene glycol methacrylate, ethoxypolyethylene glycol acrylate, and ethoxypolyethylene glycol methacrylate, and the like. Examples of ethers of alkenyl alcohols with alkylene oxides as the monomer (2) include allyl alcohol-ethylene oxide adducts, methallyl alcohol-ethylene oxide adducts, and 3-methyl-3-butene-1-ol-ethylene oxide adducts, and the like. For increasing fluidity and a 24-hour hardening strength of a hydraulic composition, polyalkylene glycol esters of (meth) acrylic acid are preferably used.

The copolymer of the present invention has constituent units containing the constituent unit 1 and the constituent unit 2. A proportion of the constituent unit 1 in the total of constituent units 1 and 2 is preferably 1 to 99% by mole, for increasing fluidity of a hydraulic composition, more preferably 40 to 98% by mole, more preferably 50 to 97% by mole, more preferably 60 to 97% by mole, more preferably 70 to 90% by mole, more preferably 70 to 85% by mole, and even more preferably 72 to 80% by mole. A proportion of the constituent unit 2 in the total of constituent units 1 and 2 is preferably 1 to 99% by mole, for increasing fluidity of a hydraulic composition, more preferably 2 to 60% by mole, more preferably 3 to 50% by mole, more preferably 3 to 40% by mole, more preferably 10 to 30% by mole, more preferably 15 to 30% by mole, and even more preferably 20 to 28% by mole. For increasing an initial fluidity of a hydraulic composition, a proportion of the total of constituent units 1 and 2 in the whole constituent units of the copolymer is preferably 30 to 100% by mole, more preferably 50 to 100% by mole, even more preferably 70 to 100% by mole, even more preferably 80 to 100% by mole, and even more preferably substantial 100% by mole.

Examples of other constituent unit than the constituent unit 1 or 2 in the copolymer include alkyl esters of unsaturated carboxylic acids and the like.

For increasing an initial fluidity of a hydraulic composition, the copolymer preferably has a weight average molecular weight of 1000 to 200000, more preferably 10000 to 100000, even more preferably 20000 to 80000, and even more preferably 38000 to 55000, as measured by gel permeation chromatography (GPC) under the following conditions.

[GPC Conditions]
equipment: high-performance GPC system HLC-8320GPC (Tosoh Corporation)
column: G4000PWXL+G2500PWXL (Tosoh Corporation)
eluent: 0.2M phosphate buffer/$CH_3CN$=9/1
flow rate: 1.0 mL/min
column temperature: 40° C.
detector: refractive index detector (RI)
sample amount: 0.5 mg/mL
standard substance: polyethylene glycol standard The copolymer can be produced by polymerization such as solution polymerization and mass polymerization of monomer components using an initiator, or by a polymeric reaction. The polymeric reaction is a process of polymerizing unsaturated carboxylic acid and then esterifying with a polyalkylene glycol-based compound to obtain a graft copolymer.

The produced copolymer can be neutralized with an alkali agent. Examples of the alkali agent include sodium and potassium hydroxides. From the viewpoint of storage stability of the dispersant for a hydraulic composition, a degree of neutralization is preferably 0.5 to 1.0, and more preferably 0.5 to 0.9.

Examples of the initiator preferably used in the polymerization to produce the copolymer include persulfates such as ammonium persulfate, sodium persulfate, and potassium persulfate; hydrogen peroxide; azo compounds such as azobis (2-methylpropionamidine) hydrochloride, and azoisobutyronitrile; peroxides such as benzoyl peroxide, lauroyl peroxide, and cumene hydroperoxide.

Examples of the method for producing the copolymer include solution polymerization such as described in JP-A62-119147, and JP-A07-223852.

<Dispersant for a Hydraulic Composition>

The dispersant for a hydraulic composition of the present invention contains N-methyldiethanolamine and the copolymer. A weight ratio of N-methyldiethanolamine [hereinafter, also referred to as component (A)] to the copolymer [hereinafter, also referred to as component (B)], (A)/(B), is preferably 1/20 to 1/1, more preferably 1/15 to 1/1, even more preferably 1/10 to 1/1, even more preferably 1/5 to 1/1, and even more preferably 1/3 to 1/1. The ranges of the weight ratio are preferable in term of an increased 24-hour hardening strength and an increased fluidity to a hydraulic composition.

The dispersant for a hydraulic composition of the present invention may be used in a solid form such as a powder or granule, or in a liquid or paste form dissolved or dispersed in a solvent. For increasing fluidity of a hydraulic composition, a content of the component (A) in the dispersant is preferably 0.1 to 40% by weight, more preferably 0.5 to 30% by weight, and even more preferably 1.5 to 20% by weight. For increasing a 7-day hardening strength of a hydraulic composition, the content of the component (A) is preferably not less than 0.5% by weight, more preferably not less than 1.5% by weight, even more preferably not less than 3% by weight, even more preferably not less than 8% by weight, and even more preferably not less than 15% by weight. For increasing fluidity and a 7-day hardening strength of a hydraulic composition, the content of the component (A) is preferably 0.1 to 40% by weight, more preferably 1 to 30% by weight, even more preferably 1.5 to 20% by weight, and even more preferably 3 to 10% by weight.

For increasing fluidity of a hydraulic composition, a content of the component (B) in the dispersant is preferably not less than 0.3% by weight, more preferably not less than 5% by weight, and even more preferably not less than 10% by weight. For suppressing a viscosity of the dispersant to make it easier to use, for example, in preparation of a hydraulic composition, the content of the component (B) is preferably not more than 60% by weight, more preferably not more than 55% by weight, and even more preferably not more than 50% by weight. For increasing fluidity of a hydraulic composition and suppressing a viscosity of the dispersant, the content of the component (B) is preferably 0.3 to 60% by weight, more preferably 5 to 55% by weight, and even more preferably 10 to 50% by weight.

For increasing fluidity and 24-hour and 7-day hardening strengths of a hydraulic composition and suppressing a viscosity of the dispersant, a total amount of components (A) and (B) in the dispersant is preferably 0.4 to 100% by weight, more preferably 6 to 85% by weight, and even more preferably 12 to 60% by weight. Among various forms, the dispersant for a hydraulic composition of the present invention is preferably used in a liquid form such as a uniform solution, more preferably a water-containing form, and even more preferably an aqueous solution form, because a uniform liquid having a suppressed viscosity can be obtained. The dispersant in the form of a uniform aqueous solution having a low viscosity can be used as a one-part formulation, which is easy to handle. The dispersant of the present invention therefore may contain components (A) and (B) and water. In cases of the dispersant of the present invention containing water, for increasing fluidity and 24-hour and 7-day hardening strengths of a hydraulic composition, a content of the component (A) in the dispersant is preferably 0.1 to 25% by weight, more preferably 0.5 to 20% by weight, even more preferably 1 to 20% by weight, and even more preferably 3 to 10% by weight. In the same cases, for increasing fluidity of a hydraulic composition, a content of the component (B) in the dispersant is preferably 1 to 50% by weight, more preferably 5 to 50% by weight, even more preferably 10 to 50% by weight, and even more preferably 15 to 45% by weight. In the same cases, for providing a uniform liquid having a controlled viscosity, a content of water in the dispersant is preferably 25 to 98% by weight, more preferably 30 to 94% by weight, even more preferably 35 to 89% by weight, and even more preferably 45 to 82% by weight. In the same cases, for increasing fluidity and 24-hour and 7-day hardening strengths of a hydraulic composition and suppressing the viscosity of the dispersant, a total amount of components (A) and (B) in the dispersant is preferably 2 to 75% by weight, more preferably 6 to 70% by weight, even more preferably 11 to 65% by weight, and even more preferably 18 to 55% by weight. In cases of using the dispersant in a liquid form, an organic solvent other than water can be used.

The dispersant for a hydraulic composition of the present invention can further contain other component than the component (A) or (B) according to need. Examples of the other component include chemical agents such as a dispersing agent, an air entraining agent (AE agent), a defoaming agent, a thickening agent, a hardening-accelerating agent, and a set retarding agent.

<Hydraulic Composition>

The hydraulic composition of the present invention contains N-methyldiethanolamine [component (A)], the copolymer [component (B)], a hydraulic powder, an aggregate, and water, wherein a weight ratio of the water to the hydraulic powder [water/the hydraulic powder, usually represented as W/P, and also as W/C when the powder is a cement] is preferably 0.20 to 0.50. For increasing an initial fluidity of the hydraulic composition, a weight ratio of the water to the hydraulic powder is not less than 0.25 and not more than 0.30. From the viewpoint of hardening strength of the hydraulic composition, the weight ratio is not more than 0.48, and more preferably not more than 0.46. Collecting them together, the weight ratio is preferably 0.25 to 0.48, and more preferably 0.30 to 0.46. The N-methyldiethanolamine and the copolymer, described above, are used for the hydraulic composition. The hydraulic composition of the present invention can be prepared by mixing the dispersant for a hydraulic composition with a hydraulic powder, an aggregate, and if needed, water. Amounts of components (A) and (B), the hydraulic powder, the aggregate, and water in the hydraulic composition can be determined from their amounts used in preparation of the hydraulic composition.

Addition of components (A) and (B) according to the present invention to a composition containing a hydraulic powder, an aggregate, and water can increase fluidity of the composition. A certain level of fluidity can be obtained even with reduced amounts in the addition. The set retarding of the composition caused by the copolymer can be therefore decreased. The components (A) and (B) may be added together as a mixture thereof or separately as individual components to a composition containing a hydraulic powder, an aggregate, and water. The components (A) and (B) may also be added in the form of the dispersant containing them.

The hydraulic powder used in the hydraulic composition of the present invention is a powder having properties for hardening by hydration, including cements and gypsums. Preferably used are cements such as normal portland cement, belite cement, moderate heat portland cement, early strength portland cement, ultra early strength portland cement, sulfate resisting portland cement, and masonry cement. These cements may be blended with blast furnace slag, fly ash, silica fume, stone powder (calcium carbonate powder), and the like.

It is considered that the N-methyldiethanolamine according to the present invention acts on $SO_3$ and aluminate phases ($C_3A$ and $C_4A$), which are minerals, in a hydraulic powder. Therefore, for increasing fluidity and 24-hour and 7-day hardening strengths of the hydraulic composition of the present invention, the hydraulic powder used in the hydraulic composition preferably contains $SO_3$ in an amount of 0.5 to 6.0% by weight. For increasing fluidity of the hydraulic composition, the content of $SO_3$ is more preferably 1.0 to 4.5% by weight, even more preferably 2.0 to 4.5% by weight, and even more preferably 3.0 to 3.8% by weight. For increasing a 24-hour hardening strength of the hydraulic composition, the content of $SO_3$ is more preferably 0.5 to 4.5% by weight, even more preferably 1.0 to 3.5% by weight, and even more preferably 1.5 to 3.0% by weight. For increasing a 7-day hardening strength of the hydraulic composition, the content of $SO_3$ is more preferably 1.0 to 4.5% by weight, even more preferably 3.0 to 4.5% by weight, even more preferably 3.5 to 4.0% by weight.

For increasing fluidity and 24-hour and 7-day hardening strengths of the hydraulic composition of the present invention, in the hydraulic powder used in the hydraulic composition, a proportion (weight ratio) of an amount of $SO_3$ to a total amount of $C_3A$ and $C_4AF$ is preferably 3.5 to 46, as represented by $SO_3/(total\ of\ C_3A\ and\ C_4AF)\times100$. For increasing fluidity of the hydraulic composition, the proportion of $SO_3$ is more preferably 10 to 35, even more preferably 15 to 33, and even more preferably 20 to 30. For increasing a 24-hour hardening strength of the hydraulic composition, the proportion of $SO_3$ is more preferably 3.5 to 35, even more preferably 10 to 28, and even more preferably 10 to 20. For increasing a 7-day hardening strength of the hydraulic composition, the proportion of $SO_3$ is more preferably 10 to 35, and even more preferably 22 to 33, as represented by $SO_3/(total\ of\ C_3A\ and\ C_4AF)\times100$. The proportion represents a ratio of an amount of $SO_3$ to the total amount of aluminate phases in the hydraulic powder.

The hydraulic composition of the present invention contains an aggregate. Examples of the aggregate include fine aggregates such as sand and coarse aggregates such as gravel. A hydraulic composition is prepared by adding sand or sand and gravel as an aggregate or aggregates to a hydraulic powder. A final product thereof is generally called as mortar or concrete.

For using the hydraulic composition of the present invention in concrete structures and products, a content of the aggregate (s) (total amount of fine and coarse aggregates) is preferably 1600 to 2000 kg, and more preferably 1650 to 1950 kg per cubic meter of the hydraulic composition. A content of the hydraulic powder is preferably 250 to 800 kg, and more preferably 280 to 700 kg per cubic meter of the hydraulic composition. A content of the water is preferably 100 to 200 kg, and more preferably 110 to 195 kg per cubic meter of the hydraulic composition.

In cases of the hydraulic composition of the present invention containing a fine aggregate only as the aggregate, for using it as mortar, an amount of the fine aggregate is preferably 100 to 300 parts by weight, and more preferably 150 to 300 parts by weight to 100 parts by weight of the hydraulic powder.

For increasing fluidity and a hardening strength of the hydraulic composition of the present invention, in the hydraulic composition, a total amount of components (A) and (B) is preferably 0.001 to 10 parts by weight, more preferably 0.01 to 5 parts by weight, even more preferably 0.05 to 2 parts by weight, even more preferably 0.10 to 0.50 parts by weight, and even more preferably 0.15 to 0.30 parts by weight to 100 parts by weight of the hydraulic powder. For increasing fluidity and 24-hour and 7-day hardening strengths of the hydraulic composition of the present invention, an amount of the component (A) is preferably 0.0005 to 5 parts by weight, more preferably 0.005 to 2.5 parts by weight, even more preferably 0.01 to 1.0 part by weight, even more preferably 0.01 to 0.3 parts by weight, and even more preferably 0.03 to 0.1 parts by weight to 100 parts by weight of the hydraulic powder. Particularly for increasing a 24-hour hardening strength of the hydraulic composition of the present invention, the amount of the component (A) is preferably 0.02 to 0.3 parts by weight, more preferably 0.04 to 0.3 parts by weight, even more preferably 0.08 to 0.25 parts by weight, and even more preferably 0.15 to 0.25 parts by weight. For increasing fluidity of the hydraulic composition of the present invention, an amount of the component (B) is preferably not less than 0.0005 parts by weight, and more preferably not less than 0.005 parts by weight to 100 parts by weight of the hydraulic powder. For suppressing set retarding of the hydraulic composition, the amount of the component (B) is preferably not more than 5 parts by weight, and more preferably not more than 2.5 parts by weight to 100 parts by weight of the hydraulic powder. Accordingly, for increasing fluidity and suppressing set retarding of the hydraulic composition of the present invention, the amount of the component (B) is preferably 0.0005 to 5 parts by weight, more preferably 0.005 to 2.5 parts by weight, more preferably 0.05 to 1.0 parts by weight, more preferably 0.1 to 0.5 parts by weight, more preferably 0.15 to 0.3 parts by weight, and even more preferably 0.15 to 0.22 parts by weight to 100 parts by weight of the hydraulic powder.

For increasing 24-hour and 7-day hardening strengths and fluidity of the hydraulic composition of the present invention, also in the hydraulic composition, a weight ratio of components (A) to (B), (A)/(B), is preferably 1/20 to 1/1, more preferably 1/15 to 1/1, even more preferably 1/10 to 1/1, even more preferably 1/5 to 1/1, and even more preferably 1/3 to 1/1.

The hydraulic composition can be produced, for example, by adding a composition containing components (A) and (B) and water, which is previously prepared, to a hydraulic powder and an aggregate.

The hydraulic composition of the present invention can be used as a material for concrete structures and concrete products. The hydraulic composition of the present invention develops increased 24-hour and 7-day compressive strengths after contacting with water, and even when blended with a hydraulic powder having a low hardening strength at an early stage after contacting with water (e.g., blast furnace slag, fly ash, or limestone and the like), can develop comparable or higher 24-hour and 7-day compressive strengths after contacting with water than those of a hydraulic composition without the component (A) and/or the component (B).

The hydraulic composition of the present invention is useful for any concrete, including ready-mixed concrete, various concrete products, self-leveling concrete, fire-proof concrete, plaster concrete, gypsum slurry concrete, light-weight and heavy-weight concretes, AE concrete, concrete for repair, prepacked concrete, tremie concrete, grout concrete, concrete for ground improving, and cold weather concrete. Moreover, the hydraulic composition of the present invention has a high fluidity right after preparation and can develop a hardening strength for about 24 hours. Therefore the hydraulic composition is suitably used for secondary concrete products, produced through repeated use of a molding frame, required to have an increased turnover rate. Examples of the secondary concrete product form the hydraulic composition by placing in a form and hardening therein include civil engineering products such as various revetment blocks, box culverts, segments used in tunnel construction work, and girders of bridge piers, and construction products such as building members for curtain wall, post, beam, and floorboard.

The hydraulic composition of the present invention has a higher fluidity than that of a hydraulic composition containing only the copolymer. It has therefore a certain level of fluidity even with a reduced amount of the copolymer. The hydraulic composition with a reduced amount of the copolymer can be decreased in delaying setting caused by the copolymer. When the hydraulic composition contains the same amount of the copolymer, it will have an increased fluidity and then, for example, have an increased filling property in a frame. The hydraulic composition further has increased 24-hour and 7-day compressive strength through hardening after contacting with water.

Moreover, the hydraulic composition of the present invention can harden in a short period to promptly produce a hardened article without extra energy such as steam heat for accelerating hardening of the hydraulic composition. This feature is also advantageous for reducing environmental loads. The hydraulic composition of the present invention can develop a sufficient hardening strength for being removed from a frame for a curing period of 4 to 30 hours, preferably for 6 to 24 hours under curing conditions without steam curing at a curing temperature of 0 to 40° C., preferably 10 to 40° C. Such curing conditions can achieve an increasing cycle of production, while suppressing the amount of required energy.

The present invention includes the following aspects:

<1> a dispersant for a hydraulic composition, containing N-methyldiethanolamine and a copolymer having constituent units represented by the formulae (1) and (2):

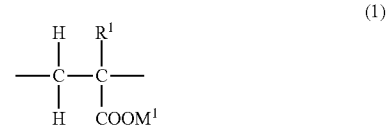

wherein, $R^1$ represents a hydrogen atom or a methyl group; and $M^1$ represents a hydrogen atom or a counter ion to form a salt; and

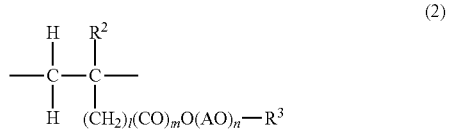

wherein, $R^2$ represents a hydrogen atom or a methyl group; AO represents an alkyleneoxy group having 2 to 4 carbon atoms; l is a number of 0 to 2; m is a number of 0 or 1; n is an average added mole number of AO and is a number of 2 to 300; and $R^3$ represents a hydrogen atom or an alkyl group having 1 to 4 carbon atoms;

<2> the dispersant for a hydraulic composition according to <1>, wherein a content of the N-methyldiethanolamine is 0.1 to 40% by weight, and a content of the copolymer is 0.3 to 60% by weight;

<3> the dispersant for a hydraulic composition according to <1> or <2>, wherein a weight ratio of the N-methyldiethanolamine to the copolymer, N-methyldiethanolamine/copolymer, is 1/20 to 1/1;

<4> the dispersant for a hydraulic composition according to any one of <1> to <3>, wherein the constituent unit represented by the formula (2) preferably has n being 2 to 250, more preferably 2 to 200, and even more preferably 2 to 150;

<5> the dispersant for a hydraulic composition according to any one of <1> to <4>, wherein the constituent unit represented by the formula (2) has m being 1 and l being 0;

<6> the dispersant for a hydraulic composition according to any one of <1> to <5>, wherein a proportion of constituent units represented by the formula 1 in the total of constituent units represented by the formulae (1) and (2) is preferably 40 to 98% by mole, more preferably 50 to 97% by mole, more preferably 60 to 97% by mole, more preferably 70 to 90% by mole, more preferably 70 to 85% by mole, and even more preferably 72 to 80% by mole;

<7> the dispersant for a hydraulic composition according to any one of <1> to <6>, wherein a proportion of the total of constituent units represented by the formulae (1) and (2) in the whole constituent units of the copolymer is preferably 30 to 100% by mole, more preferably 50 to 100% by mole, even more preferably 70 to 100% by mole, even more preferably 80 to 100% by mole, and even more preferably substantial 100% by mole;

<8> the dispersant for a hydraulic composition according to any one of <1> to <7>, wherein the copolymer preferably has a weight average molecular weight of 1000 to 200000, more preferably 10000 to 100000, even more preferably 20000 to 80000, even more preferably 35000 to 55000;

<9> the dispersant for a hydraulic composition according to any one of <1> to <8>, wherein a weight ratio of the N-methyldiethanolamine [hereinafter, also referred to as component (A)] to the copolymer [hereinafter, also referred to as component (B)], (A)/(B), is preferably 1/15 to 1/1, more preferably 1/10 to 1/1, even more preferably 1/5 to 1/1, and even more preferably 1/3 to 1/1;

<10> the dispersant for a hydraulic composition according to any one of <1> to <9>, wherein a content of the N-methyldiethanolamine is preferably 0.1 to 40% by weight, more preferably 1 to 30% by weight, and even more preferably 3 to 10% by weight;

<11> the dispersant for a hydraulic composition according to any one of <1> to <10>, wherein a content of the copolymer is preferably 0.3 to 60% by weight, more preferably 5 to 55% by weight, and even more preferably 10 to 50% by weight;

<12> the dispersant for a hydraulic composition according to any one of <1> to <11>, wherein a total content of the N-methyldiethanolamine and the copolymer is preferably 0.4 to 100% by weight, more preferably 6 to 85% by weight, and even more preferably 12 to 60% by weight;

<13> a hydraulic composition, containing N-methyldiethanolamine, a copolymer having constituent units represented by the formulae (1) and (2), a hydraulic powder, an aggregate, and water, wherein a weight ratio of the water to the hydraulic powder, water/hydraulic powder, is 0.20 to 0.50:

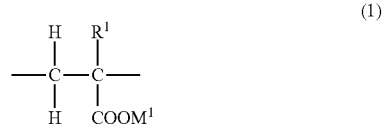

wherein, $R^1$ represents a hydrogen atom or a methyl group; and $M^1$ represents a hydrogen atom or a counter ion to form a salt; and $$\begin{array}{c} H \quad R^2 \\ | \quad | \\ -C-C- \\ | \quad | \\ H \quad (CH_2)_l(CO)_mO(AO)_n-R^3 \end{array} \quad (2)$$

wherein, $R^2$ represents a hydrogen atom or a methyl group; AO represents an alkyleneoxy group having 2 to 4 carbon atoms; l is a number of 0 to 2; m is a number of 0 or 1; n is an average added mole number of AO and is a number of 2 to 300; and $R^3$ represents a hydrogen atom or an alkyl group having 1 to 4 carbon atoms;

<14> the hydraulic composition according to <13>, wherein a weight ratio of the water to the hydraulic powder is preferably 0.25 to 0.48, and more preferably 0.30 to 0.46;

<15> the hydraulic composition according to <13> or <14>, wherein the hydraulic powder preferably contains $SO_3$ in an amount of 0.5 to 6.0% by weight, more preferably 1.0 to 4.5% by weight, and even more preferably 2.0 to 4.5% by weight;

<16> the hydraulic composition according to <13> or <14>, wherein the hydraulic powder preferably contains $SO_3$ in an amount of 0.5 to 4.5% by weight, more preferably 1.0 to 3.5% by weight, and even more preferably 1.5 to 3.0% by weight;

<17> the hydraulic composition according to <13> or <14>, wherein the hydraulic powder preferably contains $SO_3$ in an amount of 1.0 to 4.5% by weight, more preferably 3.0 to 4.5% by weight, and even more preferably 1.5 to 3.0% by weight;

<18> the hydraulic composition according to any one of <13> to <17>, wherein a total amount of the N-methyldiethanolamine and the copolymer is preferably 0.001 to 10 parts by weight, more preferably 0.01 to 5 parts by weight, and even more preferably 0.05 to 2 parts by weight to 100 parts by weight of the hydraulic powder;

<19> the hydraulic composition according to any one of <13> to <18>, wherein an amount of the N-methyldiethanolamine is preferably 0.0005 to 5 parts by weight, and more preferably 0.005 to 2.5 parts by weight to 100 parts by weight of the hydraulic powder;

<20> the hydraulic composition according to any one of <13> to <19>, wherein an amount of the copolymer is preferably 0.0005 to 5 parts by weight, more preferably 0.005 to 2.5 parts by weight, even more preferably 0.05 to 1.0 parts by weight, and even more preferably 0.1 to 0.5 parts by weight to 100 parts by weight of the hydraulic powder;

<21> the hydraulic composition according to any one of <13> to <20>, wherein the constituent unit represented by the formula (2) preferably has n being 2 to 250, more preferably 2 to 200, and even more preferably 2 to 150;

<22> the hydraulic composition according to any one of <13> to <21>, wherein the constituent unit represented by the formula (2) has m being 1 and l being 0;

<23> the hydraulic composition according to any one of <13> to <22>, wherein a proportion of constituent units represented by the formula 1 in the total of constituent units represented by the formulae (1) and (2) is preferably 40 to 98% by mole, more preferably 50 to 97% by mole, more preferably 60 to 97% by mole, more preferably 70 to 90% by mole, more preferably 70 to 85% by mole, and even more preferably 72 to 80% by mole;

<24> the hydraulic composition according to any one of <13> to <23>, wherein a proportion of the total of constituent units represented by the formulae (1) and (2) in the whole constituent units of the copolymer is preferably 30 to 100% by mole, more preferably 50 to 100% by mole, even more preferably 70 to 100% by mole, even more preferably 80 to 100% by mole, and even more preferably substantial 100% by mole;

<25> the hydraulic composition according to any one of <13> to <24>, wherein the copolymer preferably has a weight average molecular weight of 1000 to 200000, more preferably 10000 to 100000, even more preferably 20000 to 80000, even more preferably 35000 to 55000;

<26> the hydraulic composition according to any one of <13> to <25>, wherein a weight ratio of the N-methyldiethanolamine [hereinafter, also referred to as component (A)] to the copolymer [hereinafter, also referred to as component (B)], (A)/(B), is preferably 1/20 to 1/1, more preferably 1/15 to 1/1, even more preferably 1/10 to 1/1, even more preferably 1/5 to 1/1, and even more preferably 1/3 to 1/1;

<27> use of the dispersant for a hydraulic composition according to <1> to <12> for increasing fluidity of a hydraulic composition; and <28> the use according to <27> for increasing fluidity of a hydraulic composition, wherein the hydraulic composition contains a hydraulic powder, an aggregate, and water and a weight ratio of the water to the hydraulic powder, water/hydraulic powder, is 0.20 to 0.50.

EXAMPLES

The following Examples demonstrate the present invention. Examples are intended to illustrate the present invention, and not to limit the present invention.

Examples 1 to 4 and Comparative Examples 1 to 8

Preparation Example 1

In a glass reactor (four-neck flask) equipped with a stirrer, 114 g of water was stirred. The inner atmosphere of the reactor was replaced by nitrogen. Under nitrogen atmosphere, the water was heated to 80° C. To this, two aqueous solutions were added dropwise individually over 1.5 hours, one solution was prepared by mixing and dissolving 300 g of aqueous solution of 60% by weight ω-methoxypolyethylene glycol monomethacrylate (average added mole number of ethylene oxide: 120, ester purity: 100%), 11.5 g of methacrylic acid (reagent grade, Wako Pure Chemical Industries, Ltd.), and 1.2 g of 3-mercaptopropionic acid, and the other was prepared by dissolving 1.9 g of ammonium persulfate in 45 g of water. The mixture was aged for 1 hour at 80° C. To this, a solution of 0.8 g of ammonium persulfate in 15 g of water was further added dropwise over 30 minutes. The mixture was aged for 1.5 hour, with remaining at 80° C. Then, the mixture was cooled to 40° C. or lower and neutralized with an aqueous solution of 48% sodium hydroxide to obtain a copolymer having a weight average molecular weight of 54000 (degree of neutralization: 0.7). A solution was prepared by adjusting to have a solid content of 20% by weight with water. A proportion of the monomer 1 in monomers 1 and 2, monomer 1/(monomers 1+2), is 80% by mole.

Preparation Example 2

In a glass reactor (four-neck flask) equipped with a stirrer, 333.7 g of water, and 463.9 g of unsaturated polyalkylene glycol ether, produced by adding average 50 moles of ethylene oxide to 3-methyl-3-butene-1-ol, were stirred. The inner atmosphere of the reactor was replaced by nitrogen. Under nitrogen atmosphere, the mixture was heated to 60° C. To this, 2.43 g of aqueous solution of 30% hydrogen peroxide was added dropwise. Then, to this, an aqueous solution, prepared by dissolving 62.7 g of acrylic acid in 37.3 g of water, and an aqueous solution, prepared by mixing and dissolving 0.94 g of L-ascorbic acid, 2.44 g of 3-mercaptopropionic acid and 96.6 g of water, were added dropwise over 3.0 hours and over 3.5 hours, respectively. The mixture was aged for 1 hour at 60° C. Then, the mixture was cooled to 40° C. or lower and neutralized with an aqueous solution of 48% sodium hydroxide to obtain an aqueous solution containing a copolymer having a weight average molecular weight of 62000 (degree of neutralization: 0.7). The solution was adjusted to have a solid content of 45% by weight with water. A proportion of the monomer 1 in monomers 1 and 2, monomer 1/(monomers 1+2), is 81% by mole.

Preparation Example 3

In a glass reactor (four-neck flask) equipped with a stirrer, 333 g of water was stirred. The inner atmosphere of the reactor was replaced by nitrogen. Under nitrogen atmosphere, the water was heated to 80° C. To this, two aqueous solutions were added dropwise individually over 1.5 hours, one solution was prepared by mixing and dissolving 300 g of ω-methoxypolyethylene glycol monomethacrylate (average moles of ethylene oxide added: 23, NK ester M230G, Shin-Nakamura Chemical Co., Ltd.), 69.7 g of methacrylic acid (reagent grade, Wako Pure Chemical Industries, Ltd.), and 6.3 g of 3-mercaptopropionic acid in 200 g of water, and the other was prepared by dissolving 12.3 g of ammonium persulfate in 45 g of water. The mixture was aged for 1 hour at 80° C. To this, a solution of 4.9 g of ammonium persulfate in 15 g of water was further added dropwise over 30 minutes. The mixture was aged for 1.5 hours, with remaining at 80° C. After aging, then, the mixture was cooled to 40° C. or lower and neutralized with an aqueous solution of 48% sodium hydroxide to obtain an aqueous solution containing a copolymer having a weight average molecular weight of 43000 (degree of neutralization: 0.7). The solution was adjusted to have a solid content of 20% by weight with water. A proportion of the monomer 1 in monomers 1 and 2, monomer 1/(monomers 1+2), is 75% by mole.

Preparation Example 4

In a glass reactor (four-neck flask) equipped with a stirrer, 395 g of water was stirred. The inner atmosphere of the reactor was replaced by nitrogen. Under nitrogen atmosphere, the water was heated to 80° C. An aqueous solution, prepared by mixing and dissolving 261 g of ω-methoxypolyethylene glycol monomethacrylate (the average mole number of ethylene oxide added: 23, NK ester M230G, Shin-Nakamura Chemical Co., Ltd.), 67.3 g of Phosmer M [a mixture of mono phosphate of 2-hydroxyethyl methacrylate and di-phosphate of 2-hydroxyethyl methacrylate, Yuni Chemical kabushiki kaisya], and 4.3 g of mercaptopropionic acid in 141 g of water, and an aqueous solution, prepared by dissolving 8.0 g of ammonium persulfate in 45 g of water, were added dropwise, each over 1.5 hours, to the above shown reactor. The mixture was aged for 1 hour at 80° C. To this, a solution of 1.8 g of ammonium persulfate in 10 g of water was further added dropwise over 30 minutes. The mixture was aged for 1.5 hours, with remaining at 80° C. After aging, then, the mixture was cooled to 40° C. or lower and neutralized with 66 g of aqueous solution of 30% sodium hydroxide to obtain an aqueous solution containing a copolymer having a weight average molecular weight of 37000. The solution was adjusted to have a solid content of 20% by weight with water.

<Preparation and Evaluation of Mortar>

(1) Preparation of Mortar

In a mortar mixer (universal mixing stirrer, model: 5DM-03-γ, Dalton Corporation), a cement (C) and a fine aggregate (S) in amounts as shown in Table 2 were subjected to a process of dry mixing for 10 seconds. To the mixture, mixing water (W) containing a dispersant was added. At the same time, a defoaming agent was added in such an amount that an air entrainment amount was not more than 2%. The mixture was subjected to a process of main kneading for 60 seconds at a low speed rotation (63 rpm) and then for 120 seconds at a high speed rotation (126 rpm) to prepare a mortar.

A dispersant was, in addition pattern (a), an aqueous solution prepared by mixing a copolymer solution in water with an alkanolamine and water according to need to obtain contents shown in Table 1. In addition pattern (b), an aqueous copolymer solution was used as it was. In Comparative mortar 4, an alkanolamine itself was added to mixing water. Compositions of dispersants in the addition pattern (a) were shown in Table 1.

lignosulfate dispersant: lignosulfate dispersant (Borregaard LignoTech, Ultrazine NAS, aqueous solution of 20% by weight effective component)

naphthalene dispersant: naphthalene dispersant (Kao Corporation, Mighty 150, aqueous solution of 40% by weight effective component)

maleic acid dispersant: polymaleic acid dispersant of maleic acid dispersant (NOF Corporation, Malialim AKM-60F, aqueous solution of 60% by weight effective component)

Mortars of the addition pattern (b) without an alkanolamine were first prepared to determine an amount (pure amount) of the copolymer that achieved a target mortar flow of 215±30 mm (excluding Comparative Example 4). Mortars of the addition pattern (a) were then prepared with invention dispersants and comparative dispersants, respectively, in such an amount that the copolymer was added in the same amount (pure amount) to that in the addition pattern (b). Amounts (pure amounts) of ingredients were shown in Table 3.

It is noted that an amount of a dispersant in mixing water was very small and W in Table 2 represented an amount of the mixing water including the amount of the dispersant.

TABLE 2

| W/C | W | C | S |
|---|---|---|---|
| 40% by weight | 320 g | 800 g | 1400 g | water (W): mixing water (containing a dispersant for hydraulic composition)

Cement (C): normal Portland cement (normal Portland cement of Taiheiyo Cement Corporation/normal Port-

TABLE 1

| | | (A) Alkanolamine | | (B) Copolymer | | Water | |
|---|---|---|---|---|---|---|---|
| | | Kind | Content* (% by weight) | Kind | Content* (% by weight) | Content* (% by weight) | Weight ratio (A)/(B) |
| present invention composition | 1 | M-DEA | 3.9 | Production example 1 | 19.2 | 76.9 | 1/5 |
| | 2 | M-DEA | 1.0 | Production example 1 | 19.8 | 79.2 | 1/20 |
| | 3 | M-DEA | 9.1 | Production example 2 | 40.9 | 50.0 | 1/4.5 |
| | 4 | M-DEA | 3.9 | Production example 3 | 19.2 | 76.9 | 1/5 |
| | 5 | M-DEA | 16.7 | Production example 3 | 16.7 | 66.6 | 1/1 |
| | 6 | M-DEA | 9.1 | Production example 3 | 18.2 | 72.7 | 1/2 |
| | 7 | M-DEA | 1.9 | Production example 3 | 19.0 | 79.1 | 1/10 |
| | 8 | M-DEA | 0.9 | Production example 3 | 18.0 | 81.1 | 1/20 |
| Comparative product | 1 | M-DEA | 3.7 | Production example 4 | 19.3 | 77.0 | 1/5.25 |
| | 2 | M-DEA | 1.0 | Lignosulfate dispersant | 19.8 | 79.2 | 1/20 |
| | 3 | M-DEA | 2.8 | Naphthalene dispersant | 38.9 | 58.3 | 1/14 |
| | 4 | M-DEA | 100.0 | Not added | — | — | — |
| | 5 | M-DEA | 9.1 | Maleic acid dispersant | 54.5 | 36.4 | 1/6 |
| | 6 | TiPA | 9.1 | Production example 2 | 40.9 | 50.0 | 1/4.5 |
| | 7 | TEA | 9.1 | Production example 2 | 40.9 | 50.0 | 1/4.5 |
| | 8 | DEA | 9.1 | Production example 2 | 40.9 | 50.0 | 1/4.5 |

*Each content of components (A) an (B) is a percentage by weight calculated based on a pure amount of component itself.

In Tables, symbols represent the followings:

M-DEA: N-methyldiethanolamine (Nippon Nyukazai Co, Ltd., Amino Alcohol MDA)

TiPA: triisopropanolamine (Wako Pure Chemical Industries, Ltd., reagent grade)

TEA: triethanolamine (Wako Pure Chemical Industries, Ltd., reagent grade)

DEA: diethanolamine (Wako Pure Chemical Industries, Ltd., reagent grade)

land cement of Sumitomo Osaka Cement Co., Ltd=1/1, weight ratio), density: 3.16 g/cm$^3$, amount of SO$_3$: 2.67% by weight, [SO$_3$/(C$_3$A+C$_4$AF)×100]: 15.8 fine aggregate (5): area: Joyo, pit sand, FM=2.67, density: 2.56 g/cm$^3$

A weight ratio of water to a hydraulic powder, W/C, is 0.40 (40% by weight).

The fine aggregate is used in an amount of 175 parts by weight to 100 parts by weight of the hydraulic powder.

$SO_3$, $C_3A$, $C_4AF$, and the like in the cement were quantified by the following method (the same applied to other Examples and Comparative Examples). A powder X-ray diffraction apparatus RINT-2500 (Rigaku Corporation) was used under measurement conditions of: target: CuKα, tube current: 40 mA, tube voltage: 200 kV, and scanning range: 5 to 70 deg.2θ; and scanning conditions of: scan mode: step scan, step width: 0.02°, and measurement time per step: 2 seconds.

2.7 g of sample of a hydraulic powder and 0.3 g of standard "α-corundum ($Al_2O_3$)" were mixed and subjected to the powder X-ray diffraction. Peak areas were used to quantify the minerals, based on a peak area of the standard α-corundum using a Rietveld analyzing software. The Rietveld analyzing software used was PDXL Ver. 1.8 (Rigaku Corporation). From the analysis, contents in the cement in Table 2 were determined as follows: 61.9% by weight for $C_3S$, 15.8% by weight for $C_2S$, 8.5% by weight for $C_3A$, 8.4% by weight for $C_4AF$, and 2.67% by weight for $SO_3$.

(2) Evaluation of Mortar

Mortars were evaluated for mortar flow and hardening strength according to the following test methods. Results were shown in Tables 3.

(2-1) Evaluation of Fluidity

A mortar flow was measured in accordance with JIS R 5201. In this test, the falling motion described in JIS R 5201 was not performed. For each dispersant of Examples and Comparative Examples, mortars of the addition patterns (a) and (b) were prepared and measured for mortar flow. For evaluation, measured mortar flows were used to calculate a value of [flow of a mortar of the pattern a]/[flow of a mortar of the pattern b]×100 (in Tables, represented as a ratio a/b). A value of the ratio a/b equal to 100 represents that there is no change in mortar flow. The value larger than 100 represents the larger flow of a mortar of the pattern a, or the higher effect of a dispersant for hydraulic composition to increasing a fluidity.

(2-2) Evaluation of Hardening Strength

According to JIS A 1132, a mortar was put by two layers in each of five cylindrical plastic molds (diameter of a base: 5 cm, height: 10 cm) and cured in the air (20° C.) in a room at 20° C. to prepare hardened samples. Samples hardened for 24 hours from the preparation of the mortar were demolded from the mold. Among five samples, three were measured for 24-hour compressive strength. The other two were further aged in water for 7 days from the preparation, and measured for 7-day compressive strength. A compressive strength of a sample was measured according to JIS A 1108. Three measured values (for 24-hour compressive strength) and two measured values (for 7-day compressive strength) were used to calculate respective averages. For each dispersant of Examples and Comparative Examples, mortars of the addition patterns (a) and (b) were prepared and measured for compressive strength. For evaluation, measured compressive strengths were used to calculate a value of [compressive strength of a mortar of the pattern a]/[compressive strength of a mortar of the pattern b]×100 (in Tables, represented as a ratio a/b). A value of the ratio a/b equal to 100 represents that there is no change in compressive strength. The value larger than 100 represents the larger compressive strength of a mortar of the pattern a, or the higher effect of a dispersant for hydraulic composition to increasing a compressive strength.

TABLE 3

| | | | | (A) Alkanolamine | | (B) Copolymer | | |
|---|---|---|---|---|---|---|---|---|
| | | | No. | Kind | Addition amount* (part by weight) | Kind | Addition amount* (part by weight) | (A)/(B) weight ratio |
| Example | 1 | Addition pattern a | Present invention composition 1 | M-DEA | 0.04 | Production example 1 | 0.20 | 1/5 |
| | | Addition pattern b | — | — | — | Production example 1 | 0.20 | — |
| | 2 | Addition pattern a | Present invention composition 2 | M-DEA | 0.01 | Production example 1 | 0.20 | 1/20 |
| | | Addition pattern b | — | — | — | Production example 1 | 0.20 | — |
| | 3 | Addition pattern a | Present invention composition 3 | M-DEA | 0.04 | Production example 2 | 0.18 | 1/4.5 |
| | | Addition pattern b | — | — | — | Production example 2 | 0.18 | — |
| | 4 | Addition pattern a | Present invention composition 4 | M-DEA | 0.04 | Production example 3 | 0.20 | 1/5 |
| | | Addition pattern b | — | — | — | Production example 3 | 0.20 | — |
| Comparative example | 1 | Addition pattern a | Comparative product 1 | M-DEA | 0.04 | Production example 4 | 0.21 | 1/5.25 |
| | | Addition pattern b | — | — | — | Production example 4 | 0.21 | — |
| | 2 | Addition pattern a | Comparative product 2 | M-DEA | 0.04 | Lignosulfate dispersant | 0.80 | 1/20 |
| | | Addition pattern b | — | — | — | Lignosulfate dispersant | 0.80 | — |
| | 3 | Addition pattern a | Comparative product 3 | M-DEA | 0.04 | Naphthalene dispersant | 0.56 | 1/14 |
| | | Addition pattern b | — | — | — | Naphthalene dispersant | 0.56 | — |
| | 4 | Addition pattern a | Comparative product 4 | M-DEA | 0.04 | Not added | — | — |
| | | Addition pattern b | — | — | — | Not added | — | — |
| | 5 | Addition pattern a | Comparative product 5 | M-DEA | 0.04 | Maleic acid dispersant | 0.24 | 1/6 |
| | | Addition pattern b | | — | — | Maleic acid dispersant | 0.24 | — |
| | 6 | Addition pattern a | Comparative product 6 | TiPA | 0.04 | Production example 2 | 0.18 | 1/4.5 |
| | | Addition pattern b | — | — | — | Production example 2 | 0.18 | — |
| | 7 | Addition pattern a | Comparative product 7 | TEA | 0.04 | Production example 2 | 0.18 | 1/4.5 |
| | | Addition pattern b | — | — | — | Production example 2 | 0.18 | — |
| | 8 | Addition pattern a | Comparative product 8 | DEA | 0.04 | Production example 2 | 0.18 | 1/4.5 |
| | | Addition pattern b | — | — | — | Production example 2 | 0.18 | — |

TABLE 3-continued

| | | | Mortar fluidity | | Mortar strength | | | |
|---|---|---|---|---|---|---|---|---|
| | | | | | after 24 hours | | After 7 days | |
| | | | Mortar flow (mm) | Ratio a/b | (N/mm$^2$) | Ratio a/b | (N/mm$^2$) | Ratio a/b |
| Example | 1 | Addition pattern a | 233.5 | 107 | 31.9 | 115 | 70.1 | 108 |
| | | Addition pattern b | 219.0 | — | 27.8 | — | 64.9 | — |
| | 2 | Addition pattern a | 224.5 | 103 | 29.1 | 105 | 67.7 | 104 |
| | | Addition pattern b | 219.0 | — | 27.8 | — | 64.9 | — |
| | 3 | Addition pattern a | 224.0 | 106 | 33.0 | 107 | 70.3 | 110 |
| | | Addition pattern b | 211.0 | — | 30.7 | — | 64.0 | — |
| | 4 | Addition pattern a | 204.0 | 109 | 31.9 | 114 | 69.5 | 108 |
| | | Addition pattern b | 187.0 | — | 27.9 | — | 64.2 | — |
| Comparative example | 1 | Addition pattern a | 181.5 | 89 | 30.6 | 113 | 63.7 | 100 |
| | | Addition pattern b | 205.0 | — | 27.1 | — | 63.7 | — |
| | 2 | Addition pattern a | 235.0 | 96 | 11.2 | 88 | 61.4 | 99 |
| | | Addition pattern b | 244.0 | — | 12.8 | — | 62.1 | — |
| | 3 | Addition pattern a | 198.0 | 99 | 32.1 | 117 | 66.5 | 109 |
| | | Addition pattern b | 201.0 | — | 27.5 | — | 60.8 | — |
| | 4 | Addition pattern a | 113.0 | 98 | 20.8 | 102 | 52.8 | 104 |
| | | Addition pattern b | 115.0 | — | 20.3 | — | 50.8 | — |
| | 5 | Addition pattern a | 225.0 | 98 | 31.1 | 113 | 70.3 | 108 |
| | | Addition pattern b | 230.0 | — | 27.6 | — | 64.9 | — |
| | 6 | Addition pattern a | 207.0 | 98 | 31.5 | 103 | 68.9 | 108 |
| | | Addition pattern b | 211.0 | — | 30.7 | — | 64.0 | — |
| | 7 | Addition pattern a | 205.0 | 97 | 32.4 | 106 | 59.8 | 93 |
| | | Addition pattern b | 211.0 | — | 30.7 | — | 64.0 | — |
| | 8 | Addition pattern a | 207.0 | 98 | 30.9 | 101 | 65.6 | 103 |
| | | Addition pattern b | 211.0 | — | 30.7 | — | 64.0 | — |

*An amount of addition is represented by parts by weight (based on a pure amount) to 100 parts by weight of a cement.

Examples 1 to 4 showed that mortars of the addition pattern (a) using a (meth)acrylic acid-containing copolymer as a polycarboxylic acid-containing copolymer together with N-methyldiethanolamine had an increased fluidity than that of mortars of the addition pattern (b) using only a (meth)acrylic acid-containing copolymer as a polycarboxylic acid-containing copolymer. Comparative Examples 1 to 5 showed that mortars prepared using other copolymer than a (meth)acrylic acid-containing copolymer as a polycarboxylic acid-containing copolymer together with N-methyldiethanolamine or no copolymer had an unchanged fluidity. Comparative Examples 6 to 8 showed that mortars prepared using other alkanolamine than N-methyldiethanolamine together with a (meth)acrylic acid-containing copolymer as a polycarboxylic acid-containing copolymer had an unchanged fluidity.

Examples 5 to 11

Mortars of Examples 5 to 11 were prepared in the same way as in Example 1. Example 5 was positioned as the standard mortar (corresponding to Example 4 in Table 3), Examples 6 and 7 were variations with different amounts of the whole dispersant, and Examples 8 to 11 were variations with different amounts of an alkanolamine. Mortars were measured for mortar fluidity and mortar strength in the same way as in Example 1. Results were shown in Table 4. Cement (C) was the same as that in Table 2 (in respect to composition and source), except for production rots. From the same analysis as in Example 1, contents in the cement used in Examples 5 to 11 were determined as follows: 60.6% by weight for $C_3S$, 17.2% by weight for $C_2S$, 7.9% by weight for $C_3A$, 8.8% by weight for $C_4AF$, and 2.71% by weight for $SO_3$. $[SO_3/(C_3A+C_4AF)] \times 100$ was equal to 16.2.

TABLE 4

| | | | Dispersant | | | | | Mortar fluidity | | Mortar strength | | | |
|---|---|---|---|---|---|---|---|---|---|---|---|---|---|
| | | | (A) Alkanolamine | | (B) Copolymer | | | | | after 24 hours | | After 7 days | |
| | | No. | Kind | Addition amount* (part by weight) | Kind | Addition amount* (part by weight) | (A)/(B) weight ratio | Mortar flow (mm) | Ratio a/b | (N/mm$^2$) | Ratio a/b | (N/mm$^2$) | Ratio a/b |
| Example | 5 | Addition pattern a | Present invention composition 4 | M-DEA | 0.04 | Production example 3 | 0.20 | 1/5 | 196.5 | 105 | 30.9 | 115 | 69.3 | 109 |
| | | Addition pattern b | — | — | — | Production example 3 | 0.20 | — | 186.5 | — | 26.8 | — | 63.4 | — |
| | 6 | Addition pattern a | Present invention composition 4 | M-DEA | 0.036 | Production example 3 | 0.18 | 1/5 | 198.5 | 107 | 29.4 | 111 | 67.2 | 107 |
| | | Addition pattern b | — | — | — | Production example 3 | 0.18 | — | 185.5 | — | 26.5 | — | 62.8 | — |
| | 7 | Addition pattern a | Present invention composition 4 | M-DEA | 0.044 | Production example 3 | 0.22 | 1/5 | 214.5 | 105 | 30.5 | 113 | 69.9 | 110 |
| | | Addition pattern b | — | — | — | Production example 3 | 0.22 | — | 205.0 | — | 27.0 | — | 63.5 | — |

TABLE 4-continued

| | | | (A) Alkanolamine | | (B) Copolymer | | | Mortar fluidity | | Mortar strength | | | | |
|---|---|---|---|---|---|---|---|---|---|---|---|---|---|---|
| | | | | | | | | | | after 24 hours | | After 7 days | | |
| | | No. | Kind | Addition amount* (part by weight) | Kind | Addition amount* (part by weight) | (A)/(B) weight ratio | Mortar flow (mm) | Ratio a/b | (N/mm²) | Ratio a/b | (N/mm²) | Ratio a/b |
| 8 | Addition pattern a | Present invention composition 5 | M-DEA | 0.20 | Production example 3 | 0.20 | 1/1 | 199.5 | 107 | 31.0 | 116 | 70.4 | 111 |
| | Addition pattern b | — | — | — | Production example 3 | 0.20 | — | 186.5 | — | 26.8 | — | 63.4 | — |
| 9 | Addition pattern a | Present invention composition 6 | M-DEA | 0.10 | Production example 3 | 0.20 | 1/2 | 201.0 | 108 | 31.4 | 117 | 69.7 | 110 |
| | Addition pattern b | — | — | — | Production example 3 | 0.20 | — | 186.5 | — | 26.8 | — | 63.4 | — |
| 10 | Addition pattern a | Present invention composition 7 | M-DEA | 0.02 | Production example 3 | 0.20 | 1/10 | 196.0 | 105 | 30.0 | 112 | 67.6 | 107 |
| | Addition pattern b | — | — | — | Production example 3 | 0.20 | — | 186.5 | — | 26.8 | — | 63.4 | — |
| 11 | Addition pattern a | Present invention composition 8 | M-DEA | 0.01 | Production example 3 | 0.20 | 1/20 | 192.0 | 103 | 28.6 | 107 | 66.5 | 105 |
| | Addition pattern b | — | — | — | Production example 3 | 0.20 | — | 186.5 | — | 26.8 | — | 63.4 | — |

Examples 12 to 17

Cements having a composition satisfying a content of $SO_3$ and a value of $[SO_3/(C_3A+C_4AF)]\times 100$ shown in Table 6 were prepared by mixing a cement clinker containing $C_3A$ in an amount of 4% by weight and $C_4AF$ in an amount of 9% by weight as an aluminate phase with gypsum dihydrate and gypsum hemihydrate, and pulverized such that a Blain value was 3300±100 cm²/g. Mortars were prepared with these cements and ingredients in amounts shown in Table 5 in the same way as in Example 1. A weight ratio of water to a hydraulic powder (W/C) is 0.40 (40% by weight). An amount of a fine aggregate is 175 parts by weight to 100 parts by weight of a hydraulic powder. In each Example, mortars with an alkanolamine and a copolymer and with only a copolymer were prepared and measured for mortar fluidity and mortar strength in the same way as in Example 1. Results were shown in Table 6.

TABLE 5

| W/C | W | C | S |
|---|---|---|---|
| 40% by weight | 320 g | 800 g | 1400 g |

TABLE 6

| | | | Cement | | | Dispersant | | | | |
|---|---|---|---|---|---|---|---|---|---|---|
| | | | | | | (A) Alkanolamine | | (B) Copolymer | | |
| | | | Amount of $SO_3$ (% by weight) | [amount of $SO_3$/(amount of $C_3A$ + amount of $C_4AF$)] × 100 | No. | Kind | Addition amount* (part by weight) | Kind | Addition amount* (part by weight) | (A)/(B) weight ratio |
| Example | 12 | Addition pattern a | 0.85 | 6.5 | Present invention composition 4 | M-DEA | 0.04 | Production example 3 | 0.20 | 1/5 |
| | | Addition pattern b | 0.85 | 6.5 | — | — | — | Production example 3 | 0.20 | — |
| | 13 | Addition pattern a | 1.7 | 13.1 | Present invention composition 4 | M-DEA | 0.04 | Production example 3 | 0.20 | 1/5 |
| | | Addition pattern b | 1.7 | 13.1 | — | — | — | Production example 3 | 0.20 | — |
| | 14 | Addition pattern a | 2.5 | 19.2 | Present invention composition 4 | M-DEA | 0.04 | Production example 3 | 0.20 | 1/5 |
| | | Addition pattern b | 2.5 | 19.2 | — | — | — | Production example 3 | 0.20 | — |
| | 15 | Addition pattern a | 3.4 | 26.2 | Present invention composition 4 | M-DEA | 0.04 | Production example 3 | 0.20 | 1/5 |
| | | Addition pattern b | 3.4 | 26.2 | — | — | — | Production example 3 | 0.20 | — |
| | 16 | Addition pattern a | 4.0 | 30.8 | Present invention composition 4 | M-DEA | 0.04 | Production example 3 | 0.20 | 1/5 |
| | | Addition pattern b | 4.0 | 30.8 | — | — | — | Production example 3 | 0.20 | — |
| | 17 | Addition pattern a | 5.0 | 38.5 | Present invention composition 4 | M-DEA | 0.04 | Production example 3 | 0.20 | 1/5 |
| | | Addition pattern b | 5.0 | 38.5 | — | — | — | Production example 3 | 0.20 | — |

TABLE 6-continued

| | | | Mortar fluidity | | Mortar strength | | | |
| | | | | | after 24 hours (N/mm²) | Rate a/b | After 7 days (N/mm²) | Rate a/b |
|---|---|---|---|---|---|---|---|---|
| | | | Moratar flow (mm) | Rate a/b | | | | |
| Example | 12 | Addition pattern a | 182.5 | 106 | 28.1 | 110 | 65.0 | 103 |
| | | Addition pattern b | 172.0 | — | 25.5 | — | 63.1 | — |
| | 13 | Addition pattern a | 199.0 | 107 | 30.9 | 117 | 66.6 | 104 |
| | | Addition pattern b | 185.5 | — | 26.5 | — | 64.0 | — |
| | 14 | Addition pattern a | 198.0 | 108 | 31.9 | 115 | 66.4 | 104 |
| | | Addition pattern b | 183.0 | — | 27.7 | — | 63.8 | — |
| | 15 | Addition pattern a | 185.0 | 109 | 30.8 | 113 | 66.4 | 105 |
| | | Addition pattern b | 170.5 | — | 27.3 | — | 63.2 | — |
| | 16 | Addition pattern a | 177.0 | 108 | 28.2 | 110 | 66.6 | 105 |
| | | Addition pattern b | 163.5 | — | 25.7 | — | 63.4 | — |
| | 17 | Addition pattern a | 163.0 | 105 | 26.1 | 108 | 62.1 | 103 |
| | | Addition pattern b | 155.0 | — | 24.2 | — | 60.3 | — |

The invention claimed is:

1. A method of increasing fluidity of a hydraulic composition, which comprises adding a dispersant to a hydraulic composition, wherein the dispersant comprises N-methyldiethanolamine and a copolymer having a constituent unit represented by the formula (1) and a constituent unit represented by the formula (2):

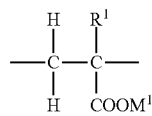
(1)

wherein, $R^1$ represents a hydrogen atom or a methyl group; and $M^1$ represents an alkali metal ion; and

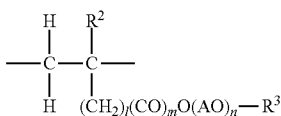
(2)

wherein, $R^2$ represents a hydrogen atom or a methyl group; AO represents an alkyleneoxy group having 2 to 4 carbon atoms; l is a number of 0 to 2; m is a number of 0 or 1; n is an average added mole number of AO and is a number of 2 to 300; and $R^3$ represents a hydrogen atom or an alkyl group having 1 to 4 carbon atoms.

2. The method according to claim 1, wherein a content of the N-methyldiethanolamine is 0.1 to 40% by weight in the dispersant.

3. The method according to claim 1, wherein a content of the copolymer is 0.3 to 60% by weight in the dispersant.

4. The method according to claim 1, wherein the dispersant comprises the N-methyldiethanolamine in an amount of 0.1 to 40% by weight and the copolymer in an amount of 0.3 to 60% by weight.

5. The method according to claim 1, wherein a weight ratio of the N-methyldiethanolamine to the copolymer, N-methyldiethanolamine/copolymer, is 1/20 to 1/1.

6. The method according to claim 1, wherein the total content of the N-methyldiethanolamine and the copolymer is preferably 0.4 to 100% by weight in the dispersant.

7. The method according to claim 1, wherein the copolymer is neutralized with sodium hydroxide.

* * * * *